Jan. 23, 1962   J. C. CARROLL ET AL   3,018,381
WIDE RANGE HIGH OUTPUT FREQUENCY DETECTOR
Filed March 24, 1959   2 Sheets-Sheet 1

WITNESSES
Edwin C. Bassler
James F. Young

INVENTORS
James C. Carroll, Francis T. Thompson
and Clarence I. Jones
BY
Paul E. Friedemann
ATTORNEY

United States Patent Office 3,018,381
Patented Jan. 23, 1962

3,018,381
WIDE RANGE HIGH OUTPUT FREQUENCY DETECTOR
James C. Carroll, North Huntingdon Township, Westmoreland County, Francis T. Thompson, Verona, and Clarence I. Jones, Monroeville, Pa., assignors to Westinghouse Electric Corporation, East Pittsburgh, Pa., a corporation of Pennsylvania
Filed Mar. 24, 1959, Ser. No. 801,659
4 Claims. (Cl. 307—88)

This invention relates to electrical control systems and more particularly to devices providing an output voltage proportional to the frequency of its input signal.

In any closed loop speed control system, it is necessary to generate a feedback signal that is proportional to the speed of the shaft to be controlled. The accuracy of the feedback signal thus determines the accuracy of the speed control system. Saturating transformers provide an accurate means of obtaining an output voltage that is proportional to its input frequency. This proportionality is due to the fact that the volt-second area for each input half cycle is a constant provided the core is driven fully into saturation.

It is a broad object of this invention to provide a control circuit that will accurately convert an electric current having a frequency input of any magnitude to a voltage output proportional to that magnitude.

A more specific object of this invention is to provide a linear frequency to voltage converter circuit using saturating transformers.

The objects cited are merely illustrative. Other objects and advantages will become more apparent from a study of the following specification and the accompanying drawings, in which.

Figure 1:
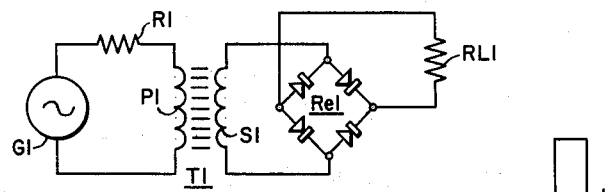
FIGURE 1 is a diagrammatic view of a frequency to voltage converter.

In FIG. 1, a saturating transformer T1 is energized from an alternating current source G1, through a series resistor R1 which is used to limit the current in the primary winding P1 when the core of transformer T1 saturates. The secondary winding S1 of transformer T1 feeds a load RL1 through a full-wave rectifier circuit Re1. In the circuit of FIG. 1, there are several sources of error resulting in an output voltage that is not a true measure of the input frequency.

Figure 2:
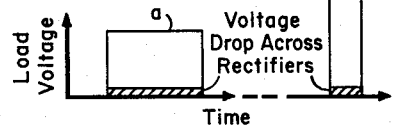
FIG. 2 is a plot of the output voltage of the circuit shown in FIG. 1 as a function of time for two different frequencies.

One source of error is shown in FIG. 2. The shaded area of the pulses represents the volt-second area lost due to the voltage drop across the rectifiers. This lost area is proportional to the time required to saturate the core of the transformer. From FIG. 2 it can be seen that the voltage drop across the rectifier for pulse $a$ is a greater percentage of the total output voltage than is the rectifier drop for pulse $b$. If a core is changed from negative to positive saturation rapidly the loss through the rectifier will be less than if this event takes place slowly. The shaded areas in FIG. 2 thus represents the losses for the two different conditions. To compensate for this error a square wave drive would be better than a sinusoidal one, as the time required to saturate the core is maintained more nearly constant with changes in frequency.

Figure 3:
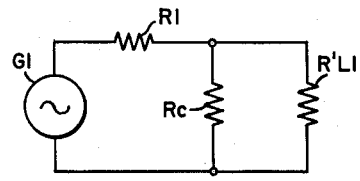
FIG. 3 is a diagrammatic view of an equivalent circuit for FIG. 1.

Another source of inaccuracy in the circuit of FIG. 1 results from the change in core loss with frequency. The core loss may be represented by a resistor Rc in parallel with the reflected load RL1, as shown in FIG. 3. As the driving frequency increases the core losses increase. The equivalent core loss resistance Rc decreases resulting in a lower voltage being applied to the core. The decrease in voltage is proportional to the series limiting resistance of resistor R1. The decrease in voltage increases the volt-second area error due to the rectifier drop as it takes longer for the core to saturate.

It is therefore advantageous to use a low value of current limiting resistance in R1, at high frequencies for accurate operation. It is also advantageous to use a low value of limiting resistance as this allows for a larger useful power output, and minimizes inaccuracies due to variations in load impedance.

However, at low frequencies, the core is saturated during most of the cycle which results in a high current if a low value of limiting resistance is used. This results in low efficiency and requires components capable of higher dissipation. A high value of limiting resistance in resistor R1 is desirable from this standpoint.

Figure 4:
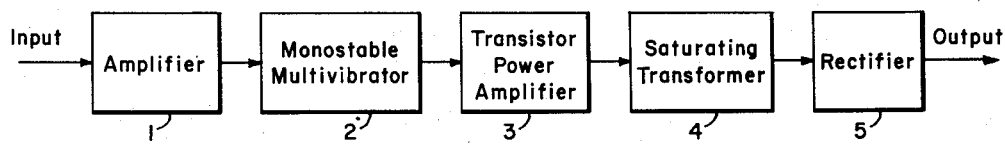
FIG. 4 is a block diagram of an application of one embodiment of this invention.

Referring to FIG. 4, there is shown a block diagram consisting of an amplifier 1 which receives the input signal of a given frequency, in series with a monostable multivibrator 2, in series with a transistor power amplifier 3, in series with a saturating transformer 4, in series with a rectifier 5 and giving a direct current output.

In the block diagram of FIG. 4, the monostable multivibrator 2 provides an output pulse for each input cycle. This pulse is somewhat longer than the time required for the core to become saturated. The pulse from the multivibrator 2 is used to turn on the power amplifier transistor for a fixed time each cycle regardless of the input frequency. A voltage output proportional to the input frequency is given across the load. When the core saturates, this essentially short circuits the output of the transistor power amplifier 3 permitting a high current to flow. However, a short time later the pulse from the multivibrator 2 is withdrawn and the transistor stops conducting.

Figure 5:
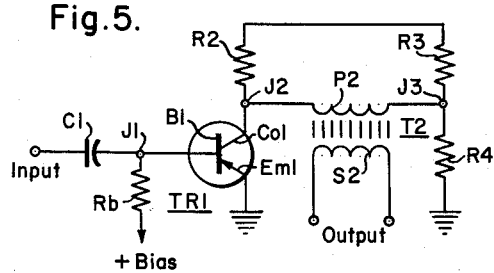
FIG. 5 is a diagrammatic view of one embodiment of this invention.

The block diagram of FIG. 4 was drawn for a single-ended output stage in which the saturating transformer can be placed in a bridge configuration as shown in FIG. 5.

Referring to FIG. 5, there is shown a capacitor C1 in series with the pulse input from the monostable multivibrator. Across the capacitor C1 from junction J1 is placed a resistor Rb to a positive bias. Junction J1 is connected to the base B1 of transistor Tr1. The emitter Em1 of transistor Tr1 is grounded. The collector Co1 is connected to junction J2 which is a junction of an energized bridge network, between junctions J2 and J3. One branch of the bridge from $-E_c$ to ground comprises resistors R2 and R3, and the other branch from $-E_c$ to ground comprises transistor Tr1 and resistor R4. The primary winding P2 of saturable transformer T2 is also connected between these junctions. The secondary winding S2 is then taken as the output of the circuit.

The pulse from the monostable multivibrator causes transistor Tr1 to fire and junction J2 is substantially a ground voltage. As the core of saturable transformer T2 saturates, a voltage output proportional to the input frequency is given. When the core of saturable transformer T2 is saturated, this allows a high current to flow in the primary circuit, being limited only by the impedance of the resistor R3 and the impedance of the primary coil P2. However, a short time later the pulse from the multivibrator is completed and the transistor T$r$1 stops conducting until the next input pulse.

Figure 6:
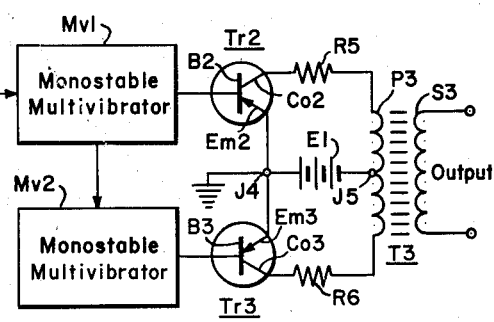
FIG. 6 is a diagrammatic view of another embodiment of this invention.

A push pull output may be used if desired. This is shown in FIG. 6. The frequency signal to be detected is applied to amplifier A$m$1, which is in series with monostable multivibrator M$v$1, which is connected to the base B2 of transistor T$r$2. Also, monostable multivibrator M$v$1 is connected to monostable multivibrator M$v$2, which is connected to the base B3 of transistor T$r$3. The transistors T$r$2 and T$r$3 are connected in push pull manner. The emitters E$m$2 and E$m$3 are connected together at junction J4, which is grounded. Across the collectors C$o$2 and C$o$3 of transistors T$r$2 and T$r$3 respectively, is placed a series circuit, comprising collector C$o$2, resistor R5, primary winding P3 of saturable transformer T3, which is center tapped at junction J5, resistor R6 to collector C$o$3 of transistor T$r$3. A direct current source E1 is connected between junctions J4 and J5. The positive terminal is connected to junction J4, between the emitters E$m$2 and E$m$3. The secondary winding S3 is taken as the output of the circuit.

For push pull operation as shown in FIG. 6, a separate monostable multivibrator is used to drive each power output transistor T$r$2 and T$r$3. The input signal triggers the first monostable multivibrator M$v$1, which in turn causes transistor T$r$2 to fire, driving the core of the saturable transformer T3 into saturation in a positive direction. As the core of saturable transformer T3 is being saturated, the output from the secondary winding S3 of the saturable transformer T3 is proportional to the input frequency. When the core of saturable transformer T3 is saturated, a high current flows in the circuit of transistor T$r$2, limited by resistor R5 and the primary winding impedance. When monostable multivibrator M$v$1 turns off transistor T$r$2, it also triggers monostable multivibrator M$v$2, which gives an output pulse turning on transistor T$r$3. As the core of saturable transformer T3 begins to saturate in the negative direction, an output is given from the secondary winding S3 which is proportional to the input signal. A rectifying circuit can be used in the output circuit to give a direct current output if desired.

When the core of saturable transformer T3 is saturated, a high current flows in the circuit of transistor T$r$3, limited by the resistance of resistor R6 and the impedance of the primary winding P3. A short time later monostable multivibrator M$v$2 turns off transistor T$r$3 and no power is transmitted to the transistors T$r$2 and T$r$3 until the next input cycle.

For particular applications, it would be possible to drive the saturating transformer directly from the output of a high power multivibrator.

The monostable multivibrator drive has the advantage of providing a rapid switching means i.e. an output wave form having a short rise time. Rapid switching keeps transistor dissipation low which allows an increase in power capability, or an increase in operating frequency at a given power level. Rapid switching also permits the use of a low value of current limiting resistance thus increasing accuracy. Another advantage of using a monostable multivibrator drive is that the rise time is independent of input frequency and wave form thereby maintaining a constant saturating time and resultant freedom from rectifier drop variations.

Figure 7:
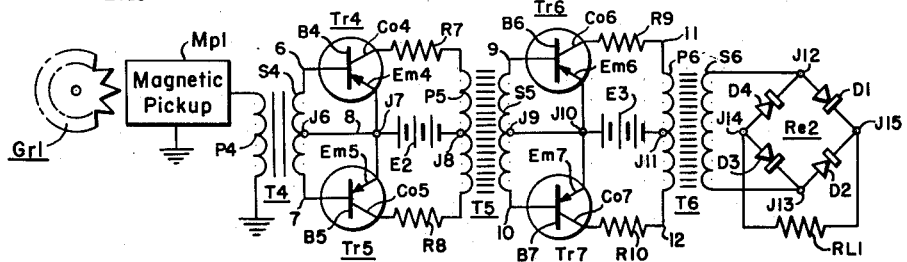
FIG. 7 is a diagrammatic view of still another embodiment of this invention.

Referring to FIG. 7, a gear G$r$1 and a magnetic pickup M$p$1 make up a transducer which generates pulses porportional to the speed of the gear. The output of the magnetic pickup M$p$1 is connected to the primary winding P4 of transformer T4 to ground. The secondary winding S4 of transformer T4 is center tapped at junction J6 to drive transistors T$r$4 and T$r$5 in push pull manner. Point 6 on secondary winding S4 is connected to the base B4 of transistor T$r$4. Point 7 on the secondary winding S2 is connected to the base B5 of transistor T$r$5. Junction J6, the center tap on the secondary winding S4, is connected through lead 8 to the emitters, E$m$4 and E$m$5, of transistors T$r$4 and T$r$5 at junction J7. The emitters E$m$4 and E$m$5 of the transistors T$r$4 and T$r$5 are common at junction 17. Between the collectors C$o$4 and C$o$5 of transistors T$r$4 and T$r$5 is placed a series circuit including a resistor R7, the primary winding P5 of a saturable transformer T5 which is center tapped at junction J8, and another resistor R8 completing the circuit between the collectors. Between junction J8 and J7 is connected a direct current source E2 with its positive terminal common with junction J7. The secondary winding S5 of saturable transformer T5 drives transistors T$r$6 and T$r$7 in push pull manner. Points 9 and 10 of secondary winding S5 are connected to the bases B6 and B7 of transistors T$r$6 and T$r$7, respectively. The emitters E$m$6 and E$m$7 are connected together at junction J10, which is common with junction J9, the center tap of secondary winding S5. Junction J10 is also connected to the positive terminal of direct current source E3, the negative terminal being connected to junction J11, the center tap of the primary winding P6 of saturable transformer T6. The collectors C$o$6 and C$o$7 of transistors T$r$6 and T$r$7 are connected to resistances R9 and R10, respectively. The other side of resistor R9 is connected to point 11 on primary winding P6. The other side of resistor R10 is connected to point 12 on primary winding P6. The secondary winding S6 of saturable transformer T6 is connected across the alternating current terminals of full wave rectifier R$e$2, including diodes D1, D2, D3 and D4. The load RL12 is connected across the direct current junctions J14 and J15 of the full-wave rectifier R$e$2.

Figure 8A:
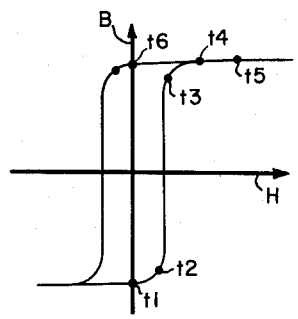
FIG. 8A is a sketch of the B—H loop for the saturable transformer T5 shown in FIG. 7.
Figure 8B:
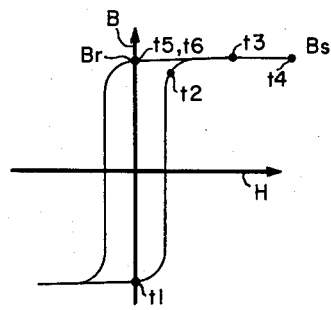
FIG. 8B is a sketch of the B—H loop for saturable transformer T6 shown in FIG. 7; and, FIG. 9 is a plot of the output voltage, of the circuit shown in FIG. 7, as a function of time.

The circuit of FIG. 7 operates as follows: The saturating transformer T6 is designed so that it will saturate at the highest frequency encountered by the circuit and will provide the required output voltage. Saturating transformer T5 is designed to saturate at a slightly lower frequency than saturating transformer T6. Because FIG. 7 is set up in push pull manner only the positive half cycle will be discussed. The transducer consisting of the gear G$r$1 and the magnetic pickup M$p$1 generates a signal whose pulse reception rate is directly proportional to the speed of the gear. This output is applied through transformer T4 to drive transistor T$r$4. The B—H loops of FIGS. 8$a$ and 8$b$ show the response of the saturable transformers T5 and T6, respectively. The time designations ($t$1, $t$2, etc.) on the curves of FIGS. 8$a$ and 8$b$ represent corresponding times on the input cycle. The time designations also apply to the output waveform shown in FIG. 9.

Figure 9:
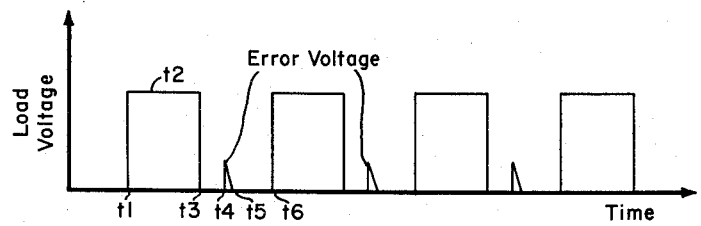

When transistor T$r$4 fires this causes a bias to be applied to transistor T$r$6 through the action of saturating transformer T5. Assume both saturating transformers T5 and T6 begin the input cycle at negative remanent flux density at $t$1. Both saturating transformers T5 and T6 start to saturate in the time period $t$1 to $t$2. The output of saturating transformer T6 is shown during this time period FIG. 9 and is proportional to the input frequency. Saturating transformer T6 saturates at $t$3 essentially shorting its secondary winding S6. This causes a high current to flow through resistor R9 in the circuit of transistor T$r$6. However, at a short time later $t$4, saturating transformer T5 is saturated, thus taking the bias from transistor T$r$6 and stopping it from conducting. Saturating transformer T6 is demagnetizing from a saturation flux density B$s$ to a remanent flux density B$r$, during the time period $t$4 to $t$5. The change of flux density will cause a small error signal to be seen at the output, as shown in FIG. 9. This error will be very small because of the square B—H loop material used. As saturating transformer T5 is now saturated a high current flows through resistor R7 in the circuit of transistor Tr4. A short time later t6 the input pulse is over and transistor Tr4 stops conducting. The positive half of the push pull operation is inoperative until the next positive half cycle. The negative input cycle causes the negative half of the push pull circuit to operate as described above for the positive input, except the saturable transformers are driven into negative saturation.

For particular applications, it would be possible to drive the first saturable transformer directly from the output of the magnetic pickup.

The circuit of FIG. 7 has the same advantages as the monostable multivibrator drive circuits of FIGS. 4, 5 and 6, except the monostable multivibrators are replaced with suitably designed saturable transformer.

While but few modifications have been shown and described, it is apparent that the invention is not limited to the particular showing made, but is susceptible of modification and changes falling well within the scope of the invention.

The claims are:

1. In an electric control circuit, in combination, an input terminal, alternating current generating means connected to said terminal to provide a signal to said terminal whose pulse repetition rate is proportional to the frequency of the current generated by the alternating current generating means; a monostable multivibrator connected to said terminal to be triggered by said generating means; a saturable transformer having a primary winding and a secondary winding and whose primary winding is interconnected with the monostable multivibrator to receive the output of said monostable multivibrator; and a suitable load circuit connected to the transformer secondary winding to receive the output from the secondary winding of said saturable transformer.

2. In an electric control circuit, in combination, an input terminal, alternating current generating means connected to said terminal to provide a signal to said terminal whose pulse repetitive rate is proportional to the frequency of the current generated by the alternating current generating means; a first monostable multivibrator connected to said terminal to be triggered by said generating means; a second monostable multivibrator connected to the first monostable multivibrator to be triggered when the output of said first multivibrator is cut off; a saturable transformer having a secondary winding and a center tapped primary winding connected to receive first the output of said first monostable multivibrator which drives the core of said saturable transformer into positive saturation and then said saturable transformer to receive the output of said second monostable multivibrator when said first monostable multivibrator cuts off and to drive the core of said saturable transformer into negative saturation; and a suitable load circuit connected to the secondary winding to receive the output from the secondary winding of said saturable transformer.

3. In an electric control circuit, in combination, an input terminal generating means connected to said terminal to provide a signal to said terminal whose pulse repetitive rate is proportional to the frequency of the current generated by the alternating current generating means; a first monostable multivibrator connected to said terminal to be triggered by said generating means; a second monostable multivibrator connected to the first monostable multivibrator to be triggered when the output of said first multivibrator is cut off; transistor power amplifier means to receive the outputs of said first monostable multivibrator and the output of said second monostable multivibrator; a saturable transformer having a secondary winding and a center tapped primary winding connected to receive first the amplifier output of said first monostable multivibrator to drive the core of said saturable transformer into positive saturation and when said saturable transformer receives the amplifier output of said second monostable multivibrator when the said first monostable multivibrator cuts off said second monostable multivibrator to drive the core of said saturable transformer into negative saturation; and a suitable load circuit connected to the secondary winding to receive the output from the secondary winding of said saturable transformer.

4. In an electric control circuit, in combination, an input terminal generating means connected to said terminal to provide a signal to said terminal whose pulse repetitive rate is proportional to the frequency of the current generated by the alternating current generating means; a first monostable multivibrator connected to said terminal to be triggered by said generating means; a second monostable multivibrator connected to the first monostable vibrator to be triggered when the output of said first multivibrator is cut off; a transistor power amplifier to receive the outputs of said first monostable multivibrator and the output of said second monostable multivibrator; a saturable transformer having a primary winding connected to receive the output of said transistor power amplifier and having a secondary winding; said transistor power amplifier includes two transistors connected in a push pull manner, the output of the said first monostable multivibrator is connected to the base terminal of a first transistor, the output of the second monostable multivibrator is connected to the base terminal of a second transistor, the emitter terminals of said transistors are connected together to a common first junction which is grounded, a source of direct current, a series circuit placed between the collector terminals of said transistors, the said series circuit includes a first resistor, the primary winding of said saturable transformer which is center tapped, and a second resistor, said source of direct current being connected between said center tap and said first junction with its positive terminal toward said junction; and a suitable load circuit connected to the secondary winding to receive the output from the secondary winding of said saturable transformer.

References Cited in the file of this patent

UNITED STATES PATENTS

| | | |
|---|---|---|
| 2,780,782 | Bright | Feb. 5, 1957 |
| 2,873,371 | Van Allen | Feb. 10, 1959 |
| 2,882,404 | Denton | Apr. 14, 1959 |

OTHER REFERENCES

Reference Data for Radio Engineers, 4th edition, 1957, I.T. & T. Corp., 67 Broad Street, New York 4, N.Y., p. 323.